United States Patent [19]
Wadman

[11] Patent Number: 5,099,528
[45] Date of Patent: Mar. 31, 1992

[54] PERAMBULATOR ROCKING UNIT

[75] Inventor: Alexis A. F. Wadman, Bedfordview, South Africa

[73] Assignee: A V Entertainment (Proprietaty) Limited, Cape Town, South Africa

[21] Appl. No.: 574,462

[22] Filed: Aug. 28, 1990

[30] Foreign Application Priority Data

Aug. 29, 1989 [ZA] South Africa .................. 89/6592

[51] Int. Cl.⁵ ................................. A47D 9/02
[52] U.S. Cl. ......................... 5/109; 180/166
[58] Field of Search .............. 5/108, 109; 180/166; 280/47.12; 128/36

[56] References Cited

U.S. PATENT DOCUMENTS

| | | | |
|---|---|---|---|
| 2,632,517 | 3/1953 | Fraunfelder et al. | 180/166 X |
| 2,689,355 | 9/1954 | Frank | 5/109 |
| 2,916,745 | 12/1959 | Lesk et al. | 5/109 |
| 3,031,686 | 5/1962 | Muzzey | 5/109 |
| 3,139,630 | 7/1964 | Hunt | 5/109 |
| 3,156,932 | 11/1964 | Mauther | 5/109 |
| 3,235,891 | 2/1966 | Chade et al. | 5/109 |
| 4,809,373 | 3/1989 | Murray | 5/109 X |
| 4,856,130 | 8/1989 | Berkovich | 5/109 |

Primary Examiner—Andres Kashnikow
Assistant Examiner—Michael Mar
Attorney, Agent, or Firm—Bucknam and Archer

[57] ABSTRACT

A perambulator rocking unit suitable for use in carrying out rocking of a perambulator of any type, including a push chair, stroller, or full sized perambulator, is provided. The rocking unit comprises a cradle support for at least one wheel, but preferably two, cradle supports for two laterally spaced, axially aligned wheels, of a perambulator, the cradle supports in turn being carried by a body supported by support rockers engaging the floor. A rocking mechanism is provided wherein a weight is cyclically moved from side to side across the center of gravity of the rocker unit to effect rocking thereof to and fro, with consequent rocking of a perambulator partially supported thereon.

14 Claims, 3 Drawing Sheets

PERAMBULATOR ROCKING UNIT

FIELD OF THE INVENTION

This invention relates to a perambulator rocking unit of the type adapted to effect rocking of an infant's perambulator, in order to pacify an infant in well known manner. In this specification the term "perambulator" is intended to include perambulators themselves, push chairs, strollers, or any other wheeled vehicles adapted to carry infants, and the rocking of which can provide a desirable effect on an infant such as causing it to become pacified or go to sleep.

BACKGROUND TO THE INVENTION

Perambulator rocking units of many different types have been proposed heretofore. However, as far as applicant is aware, most of these involve the use of very complicated arrangements and, in particular, a perambulator generally has to be attached to such a rocking unit by some form of attachment means or other.

Thus, one type of rocking unit which has been made available comprises a support having inclined surfaces on which the wheels of a perambulator are to be moved, and a tension device for association with the axle of a perambulator to pull it so that its wheels ride up the inclined surfaces, and then to relax the tension so that the wheels return down the inclined surfaces.

This arrangement provides both an up and down, and forward and backward, rocking movement which, may be undesirable. Also, numerous modern perambulators do not have axles and a special modification would be necessary in order to render such a unit effective on axle-less perambulators.

Furthermore, the tension imparting arrangement has to be physically associated with the perambulator and, in addition, the intermittent application of load in moving the perambulator up the inclined surfaces is not conducive to promoting a long life of what should, for practicality sake, be a lightweight motor unit.

It is the object of this invention to provide a perambulator rocking unit which has a particularly simple construction, which is easy to locate operatively relative to a perambulator, and which imparts a desirable movement to a perambulator in use.

SUMMARY OF THE INVENTION

In accordance with this invention there is provided a perambulator rocking unit comprising a body having at least one cradle support for a perambulator wheel, the body being supported on support rockers therefor which render the body rockable about a transverse central line, and wherein a lowermost region of the cradle support and the centre of gravity of the body are both located substantially directly over said transverse central line, a weight movable from side to side across the center of gravity of the body to effect rocking of the body on the support rockers, and drive means for effecting such movement of the weight cyclically.

Further features of the invention provide for the body to have a cradle support for each of two spaced, axially aligned perambulator wheels; for the weight to be movable in a circle about an upwardly extending axis; for the weight to be supported at a radially outer position by a support wheel engaging a support surface associated with the body; and for the weight to be composed of an electric motor itself, optionally together with an additional weight if required, wherein the motor is rotatable about said upwardly extending axis, with its own axis being at right angles thereto.

Additional features of the invention provide for the body to comprise a central part having, on each side thereof, one of a pair of spaced support members with each of which is associated a cradle support and a support rocker; for the central part to carry the weight and the drive means; and for the support rockers to be located inwardly of the extremities of the body.

A still further important feature of the invention provides for the support rockers to have a profile composed of two substantially flat surfaces diverging upwardly from a central, arcuate, interconnecting part of the rocker surface located substantially on said transverse central line.

When the means for effecting movement of the weight cyclically is electrically powered, the electrical power supply may be a battery or a mains supply. In such a case electrical control circuitry may be included to provide for the rocking unit to be switched on according to the detection of predetermined sounds (in particular a baby crying). Such electrical circuitry may also include a timer to switch the rocking unit off after a predetermined time period. The unit may also embody a music box.

The above and other features of the invention will become more apparent from the following description of one embodiment thereof with reference to the accompanying drawings.

DETAILED DESCRIPTION WITH REFERENCE TO THE DRAWINGS

Figure 1:
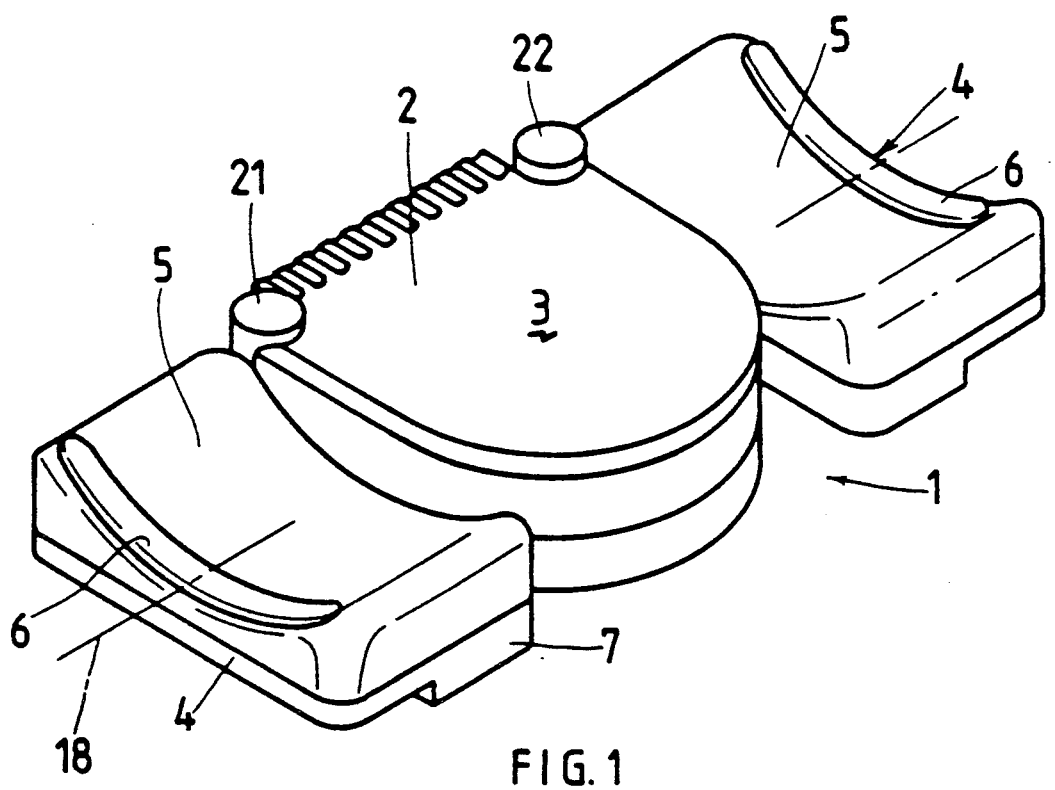
FIG. 1 is an isometric view of a perambulator rocking unit according to the invention.

In this embodiment of the invention a perambulator rocking unit, generally indicated by numeral 1 in FIG. 1, comprises a body 2 having a central part 3 and a pair of spaced support members 4, one on each side of the central part 3.

Figure 2:
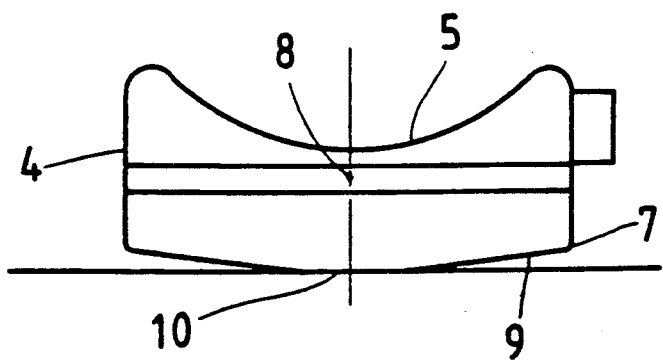
FIG. 2 is an end view of a cradle support and associated support rocker.
Figure 3:
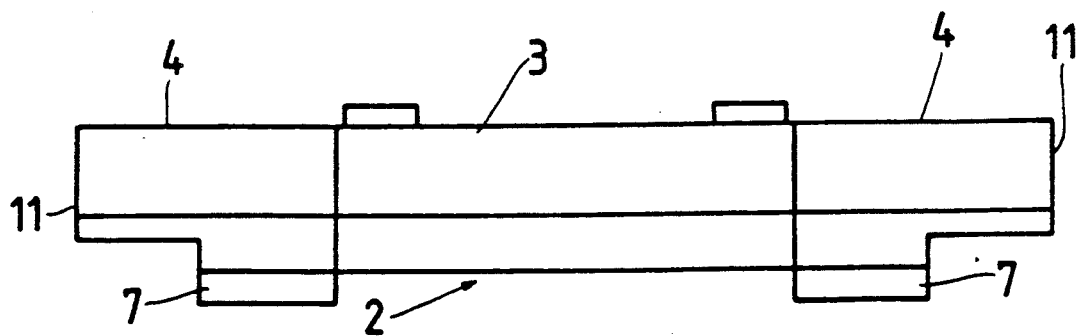
FIG. 3 is a front elevation of the perambulator rocking unit.

Each support member has its upper surface formed to define a cradle support 5 for receiving a wheel of a perambulator, the cradle support 5 being of part-circular shape in end view as shown most clearly in FIG. 2, and having a raised ridge 6 at its outer extremity to prevent a wheel from moving laterally off the cradle surface, in use. The radius of curvature of the part-circular cradle surface is chosen so as to be at least as large, and if not larger than, the radius of the largest perambulator wheel with which the rocking unit is to be used.

Each support member 4 also has a support rocker 7 formed at its under-surface such that the whole body can rock about the two spaced support rockers 7 and about a transverse central line or axis parallel to the axis of the part-circular cradle supports 5. Also, the axis of the part-circular cradle support 5 is located directly above the center of the rocker surfaces and, in addition, the center of gravity indicated by numeral 8 of the body is preferably also located directly above the transverse central line which connects the lowermost points of the support rockers.

It is considered to be an important feature that the rocker surfaces have a profile defined by two substantially flat sections 9, which diverge outwardly from the lowermost portion 10 of the rocker surface, at which point the two flat surfaces 9 are joined through an arcuate, central, interconnecting part defining said lowermost portion 10. The effect of this is that the body basically rocks between two positions in which it is supported on the flat surfaces 9 alternately. Also, it is to be mentioned that the support rockers are located inwardly from the lateral extremities 11 of the support members so that the likelihood of toes or fingers being caught under the rocker surfaces is substantially diminished.

Figure 4:
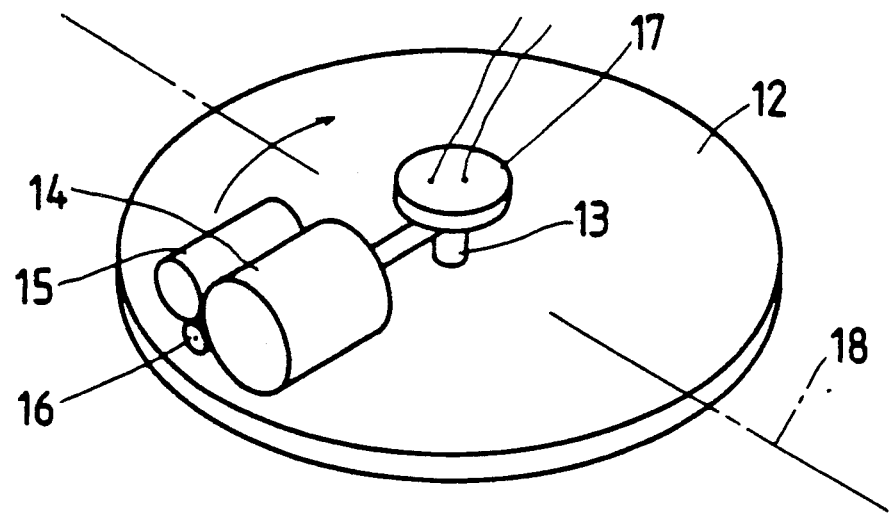
FIG. 4 is a schematic, isometric illustration of the internal mechanism for oscillating a weight from side to side about the centre of gravity of the rocking unit body.
Figure 5:
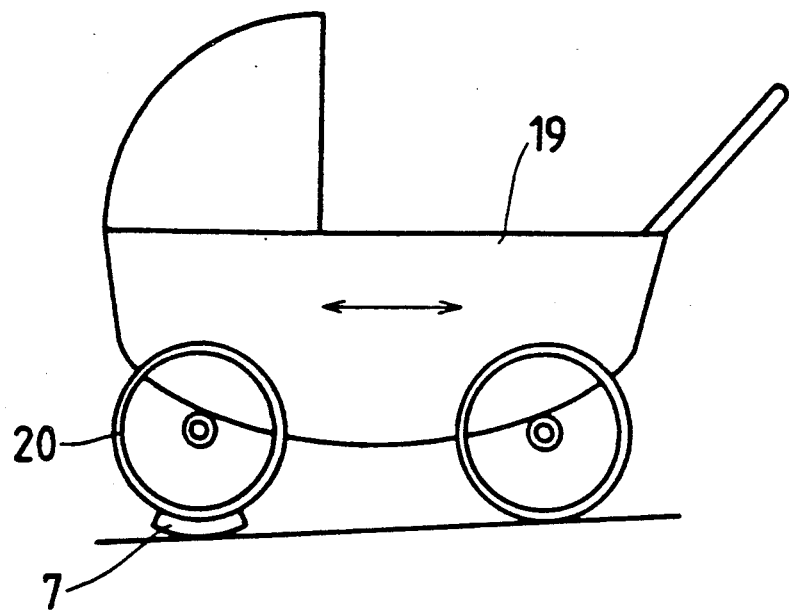
FIG. 5 is an elevation illustrating a perambulator in association with a rocking unit according to the invention; and, FIG. 6 is a block diagram of one arrangement of electrical circuit for controlling the rocking unit.
Figure 6:
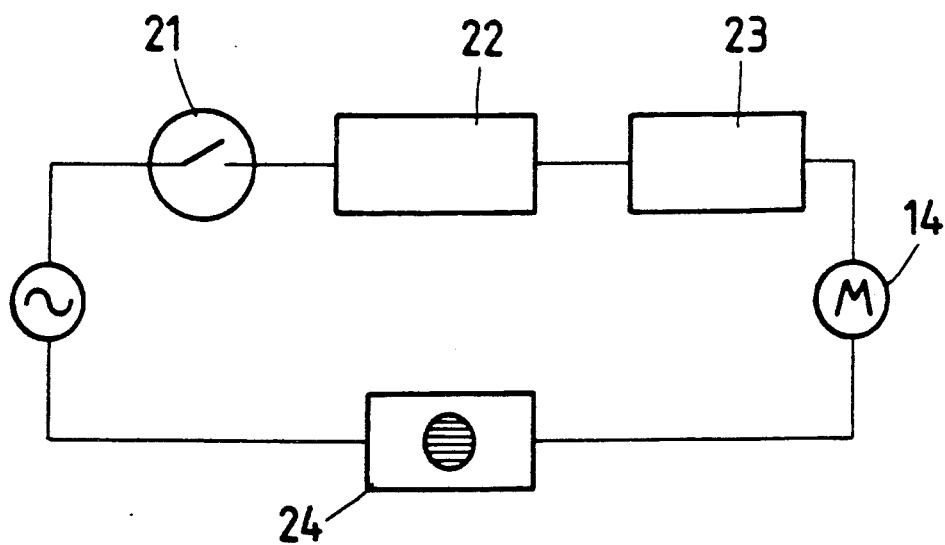

In order to effect the rocking motion of the body, the central part of the body houses a weight mechanism (see FIG. 4) which is composed of a flat support surface 12 of circular shape, and located with its axis in line with the center of gravity 8 of the body. The support surface 12 has a fixed (non-rotatable) axle 13 extending upwardly therefrom.

A weight unit 14 assumes the form of an electric motor, and optionally an additional weight 15, supported radially outwardly on a support wheel 16 which runs on the support surface 12, whilst the inner end of the motor unit is attached to, and supported by, the fixed axle through a gear drive unit 17 of the bevel type. This enables the entire gearbox and weight unit to rotate about the fixed axle 13 when the motor is in operation. Certain types of motor vehicle windscreen wiper motors have been found to be ideally suited for this purpose, as they embody electric motor and gearbox in a "ready-to-use" form, and the fixed axle is defined by the normally driven windscreen wiper operator spindle of the motor assembly. Built-in slip rings enable electricity to be supplied to the motor as it rotates about the fixed axle 13.

It will be understood that the mechanism described above, when in operation, causes the weight unit 14 to rotate about the axis of the axle 13 which, in turn, causes the weight to move cyclically from one side of the axis 18 and center of gravity of the body, to the other side.

This has the effect of rocking the rocking unit backwards and forwards between the two positions in which it is supported on the flat faces 9 of the rocker surface as the weight moves adequately from one side to the other.

In use, a perambulator 19 will have, for example, its two front wheels 20 located in the cradles and the electric motor is operated. This causes the weight unit to move around the circular support surface and the weight to be transferred from one side of the center of gravity of the body to the other cyclically. The rocking unit alternately moves from being supported on one of the flat surfaces 9 of the rocker surfaces to the other. The nature of the rocker surfaces causes the rocking unit to move decisively from being supported on flat surface of the support rocker to the other and, it has been found, that this imparts a most desirable movement to a perambulator. The perambulator wheels simply move on the cradle surfaces during this movement.

The perambulator rocking unit is also provided with an on/off switch 21 and an adjustable timer unit 22 which can be set to activate the perambulator rocking unit for predetermined lengths of time. The electrical circuit may also include a sound activated switch 23 adapted, for example, to be activated by a baby's cry. A musical box 24 or other sound emitting device may also be energised during energisation of the motor. Clearly the motor could be either battery or mains electrical supply operated.

It has been found that a perambulator rocking unit as above described operates highly effectively in use and imparts a most desirable motion to a perambulator.

Numerous variations may be made to the embodiment of the invention described above without departing from the scope hereof which is limited only to the provision of the cradle support surfaces supported on rockers with a weight moving cyclically from one side to the other to cause the unit to rock back and forth on its rockers. Thus, for example, a weight could move transversely across the body in a reciprocating straight line, or a freely movable rolling weight could be employed with means for transferring it from one side of the center of gravity to the other cyclically over a hump. Also, it may be found to be adequate to provide a cradle support for only one wheel of a perambulator.

The invention therefore provides a simple yet highly effective perambulator rocking unit which operates highly effectively in use.

What I claim is new and desire to secure by Letters Patent is:

1. A perambulator rocking unit comprising a body having at least one cradle support for receiving and supporting a perambulator wheel, the body being supported on support rockers having a central part with upwardly diverging surfaces therefor which render the body rockable about a transverse central line which connects the lowermost points of the support rockers, and wherein a lowermost region of the cradle support and the center of gravity of the body are both located substantially directly over said transverse central line, a weight located within said body and being movable from side to side across the center of gravity of the body to effect rocking of the body on the support rockers, and drive means for effecting such movement of the weight cyclically.

2. A perambulator rocking unit as claimed in claim 1 in which the body has a cradle support for each of two spaced, axially aligned perambulator wheels.

3. A perambulator rocking unit as claimed in claim 2 in which the body comprises a central part having on each side thereof one of a pair of spaced support members with each of which is associated a cradle support and a support rocker.

4. A perambulator rocking unit as claimed in claim 3 in which the central part carries the weight and drive means.

5. A perambulator rocking unit as claimed in claim 1 in which the support rockers each have a profile composed of two substantially flat surfaces diverging upwardly from a central, arcuate interconnecting part of the rocker surface located substantially on said transverse central line.

6. A perambulator rocking unit as claimed in claim 1 in which the support rockers are located inwardly of the extremities of the body.

7. A perambulator rocking unit as claimed in claim 1 in which the weight is movable in a circle about an upwardly extending axis.

8. A perambulator rocking unit as claimed in claim 7 in which the weight is supported at a radially outer position by a support wheel engaging a support surface associated with the body.

9. A perambulator rocking unit as claimed in claim 7 in which the weight is composed, at least in part, of a electric motor constituting said drive means.

10. A perambulator rocking unit as claimed in claim 9 in which the motor is rotatable about said upwardly extending axis with its own axis being at right angles thereto.

11. A perambulator rocking unit as claimed in claim 1 in which the said drive means are electrically operated either through a battery or mains electrical supply.

12. A perambulator rocking unit as claimed in claim 1 in which electrical control circuitry is provided for the drive means and includes an optionally adjustable timer for terminating operation of the unit.

13. A perambulator rocking unit as claimed in claim 12 in which the control circuitry includes a sound-operated switch for activating the unit.

14. A perambulator rocking unit as claimed in claim 1 in which the unit includes a musical box or other source of music.

* * * * *